March 4, 1969 S. C. BERGER 3,430,868
TORCH TIP
Filed Dec. 6, 1966
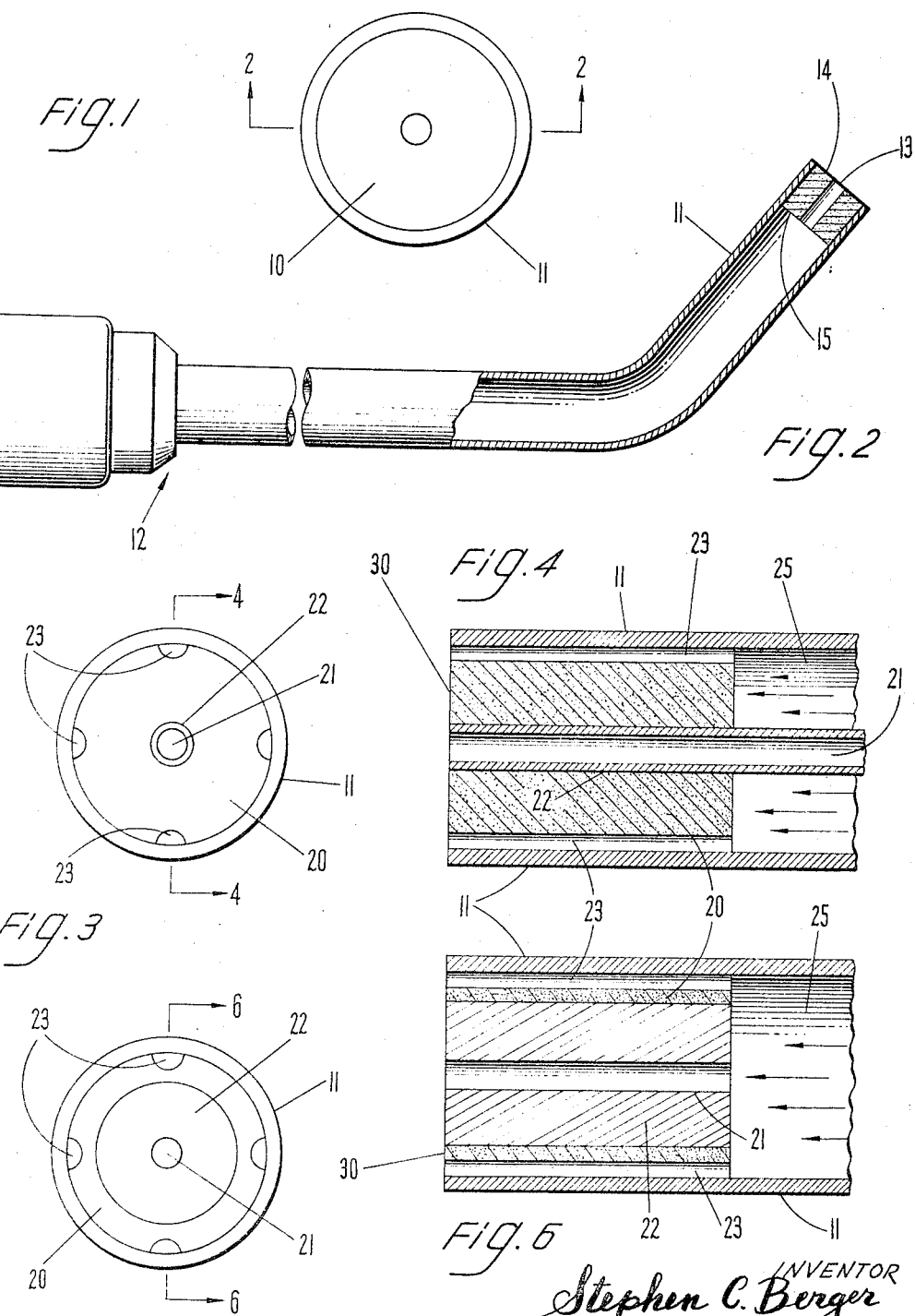
INVENTOR
Stephen C. Berger
BY
Wolf, Greenfield & Hieken

United States Patent Office 3,430,868
Patented Mar. 4, 1969

3,430,868
TORCH TIP
Stephen C. Berger, 33 Mosman St.,
West Newton, Mass. 02165
Filed Dec. 6, 1966, Ser. No. 599,622
U.S. Cl. 239—590.3                 11 Claims
Int. Cl. F23d 13/26, 13/36

ABSTRACT OF THE DISCLOSURE

A sintered metal material is used as a torch tip for a brazing tip or a cutting tip in the present invention. Passageways are provided in the sintered metal without substantially affecting the porosity of the sintered metal at the surface of the passageways so as to allow gas flow within the tip which enhances the flame characteristics of flames produced by burning gases at the tip.

Background of the invention

The present invention relates to torch tips which are preferred for use in brazing including soldering, and in cutting. Commonly, in the prior art, torch tips for brazing comprise a metal tube into which is fed a mixture of fuel gases which are burned at the orifice opening of the tube. In some cases, inserts are provided within the tube to adjust the flame velocity and temperature. In cutting tips, an insert is normally provided composed of a solid metal having a plurality of outer fuel passageways and a center oxygen passageway. Such tips often have problems such as sputtering of the flame produced and excessive use of oxygen over that required for the particular heat produced.

Summary of the invention

In the present invention, a torch tip for use in brazing or cutting is formed comprising a sintered metal plug having at least one fuel gas outlet passageway formed directly in the plug and a surrounding peripheral sleeve at least flush with the outlet surface of the plug whereby a mixture of gas can be passed through the plug and plug passageway along with oxygen if desired. Preferably the brazing tip is formed with a single outlet passageway for the fuel gases used while the cutting tip is formed with a centrally located oxygen passageway with a plurality of gas outlet passageways arranged about the oxygen passageway.

It is a feature of this invention that increased burning velocity and increased heat for a specific fuel gas can be obtained by the use of the sintered metal materials as compared wtih conventional torch tips. Moreover, the cutting tip of the present invention can be successfully used in conjunction with Mapp gas or natural gas as a fuel where prior art cutting tips often produce insufficient heat and/or inadequate burning velocities when used with these gases.

The above and other features and advantages of the present invention will be better understood from the following specification when read in conjunction with the accompanying drawings in which:

FIG. 1 is a top plan view of a brazing tip in accordance with the present invention;

FIG. 2 is a cross sectional view thereof taken through line 2—2;

FIG. 3 is a top plan view of an alternate embodiment of a torch tip of this invention;

FIG. 4 is a cross sectional view taken through line 4—4 of FIG. 3;

FIG. 5 is a top plan view of a second alternate embodiment; and,

FIG. 6 is a cross sectional view taken through line 6—6 of FIG. 5.

The sintered metal inserts employed in the torch tips of this invention are preferably formed of high temperature alloys resistant to temperatures over 1000° F. For example, stainless steel and nickel-chrome alloy sintered materials are highly useful in the present invention. The tip inserts can be fabricated by conventional sintered metal procedures preferably using 20 to about 100 micron particles as starting material. Sintering is carried out at temperatures slightly above the melting temperatures of the alloys or metals used at pressures sufficiently high to cause joining of the particles. For example, when stainless steel particles are used, temperatures of approximately 2500° F. are employed. The porosity of the sintered metal materials is preferably in the range of from about 3% to about 10% at 15 p.s.i. although the porosity can be at least as high as 50%. Porosity values above 10% do not substantially add to the advantages of the tips.

The sintered metal inserts are preferably in the form of discs, doughnuts or cylindrical rings although other configurations can be used. In all cases, it is preferred that outlet passageways for fuel gases and oxygen formed in the sintered metal inserts of the present invention be formed during the sintering process. This assures porosity of the insert material along the passageways. It is possible to first form a desired sintered metal torch tip insert and later drill holes through it although this might tend to clog the porosity at the passageway surfaces and interfere with the desired flame characteristics.

Turning now to the embodiment of FIGS. 1 and 2 showing a brazing tip sintered metal insert 10 in a conventional tube 11 which may be a copper tube, of a conventional welding torch 12 for supplying fuel gas and oxygen from the gas supply of the torch. The insert 10 is in a doughnut or ring form. The insert 10 has a centrally located passageway 13 axially aligned with the axis of the copper tube 11 at the tip. Preferably the insert 10 is bonded to the copper tube 11 by swaging of the copper tube 11 at the tip area. However, the bond between the insert 10 and tube 11 can be made by conventional fusing, chemical adhesion or other means. In all cases, the copper tube 11 is flush with the forward surface 14 of the insert or extends beyond it. This is important to prevent flickering of the gas flame produced and dissipation of heat at the tip.

In the preferred embodiment the insert 10 has an outside diameter of approximately ½ inch, passageway 13 has a diameter of approximately 1/16 inch and the insert has a thickness of approximately ¾ of an inch. It should be understood that the dimensions can vary considerably in all of the sintered metal inserts of the present invention. For example, the thickness of the insert can vary from approximately ¼ inch to 3 inches and more while the diameters of both the passageways and the insert can be greatly enlarged depending upon the particular application and the fuel velocity required.

In use, a mixture of fuel gas and oxygen passes from the torch 12 through tube 11 and out through the outlet passageway 13. A small portion of gas flow passes directly through the body of the insert 10 from the rear surface 15 and acts to create a small pilot flame at the surface 14 which pre-heats the gases. Moreover, the high velocity of fuel gases passing through passageway 13 tends to create a venturi effect drawing some gas through the body of the sintered metal insert to the inner surface of the passageway which creates significant turbulence within the passageway. The turbulence is important and is a primary factor for increasing flame temperature and flame velocity issuing from a sintered metal tip in accordance with the present invention. For example, when a standard LP gas such as natural gas is used in a brazing tip of the type shown in FIGS. 1 and 2, flame velocities of 20 feet per second and flame temperatures of at least 5400° F. are obtained. This compares favorably with prior art brazing tips where flame velocities of approximately 5.5 feet per second and temperatures of 5200° F. are customary.

The turbulence created by the use of the sintered metal with a passageway directly formed therein enables a reduction in oxygen consumption with production of pure white brazing flames which indicates maximized combustion of the fuel gases used.

The tube 11 which surrounds the insert 10 as previously described is flush with the surface 14. The tube can extend forward of the surface 14. In all cases, the outermost periphery of the disc 10 is encased by a tube such as 11 which protrudes at least to the forwardmost portion of the insert or in some cases, the pores at the periphery of the disc can be closed by means other than the tube 11. Any material which would clog the outside peripheral pores can be coated over the periphery of the discs so long as the forwardmost portion of the tip has substantially blocked pores at all of its surrounding surface area or periphery.

The embodiments of FIGS. 3–5 employ the principles described above with regard to the brazing tip in cutting tip inserts of sintered metal. Thus, in the embodiment of FIGS. 3 and 4, a ring-shaped insert 20 is used dimensioned as is the insert 10 but having a central passageway 21. The pores at the surface of passageway 21 are blocked by a tubular stainless steel insert 22 which is interconnected with an oxygen gas supply. About the periphery of the insert 20 are arranged four equally spaced axially extending holes or preferably parallel passageways 23 which can be semi-circular as shown or circular or of any other desired configuration. The passageways 23 are preferably formed as shown with tube 11 closing a side thereof to simplify manufacture of the inserts. The passageways 23 act as preheating passageways for flow of a fuel gas 25 from a conventional torch handle. An oxygen stream is provided in the central passageway through the tube 22.

Thus, the passageways 23 provide for heating of a work surface by fuel gas which can be mixed with oxygen and allow the oxygen from tube 22 to cut the work surface as by oxidizing the metal surface treated.

As in the other embodiments of this invention, the outer surface of the insert has its pores blocked up to the front outer surface 30 of the insert by the tube 11 to prevent passage of fuel gas in any direction other than forward of the insert and to prevent outside air being drawn into the insert by venturi action.

FIGS. 5 and 6 indicate an embodiment of the invention substantially identical to that shown in FIGS. 3 and 4. However, the tube 22 has increased thickness to substantially cover all of the space between the central passageway 21 and the ring insert 20 just up to the fuel passageways 23. This embodiment is included to show the versatility of sintered metal discs or inserts for use in the present invention.

Natural gas and Mapp gas require specially designed torch tips when used as cutting gases and often have significant problems when used in cutting. However, due to the increased turbulence caused by gas flow through the sintered metal inserts, resulting increased burning velocity and increased heat derived by the present invention, such gases can be used at low pressures in cutting tips as described herein.

While specific embodiments of the present invention have been shown and described, many modifications thereof are possible. The sintered metal discs can have square or irregular outer peripheries rather than being circular as shown. Similarly, the passageways formed can vary in number and positioning and need not be circular but can be square, irregular or of other shapes in cross section. The passageways can vary in diameter and could for example be frustro-conical in shape. While it is preferred that the face or outermost surface of the disc such as 14 and 30, be flat and perpendicular to the axis of the passageways, irregular surfaces can be used or the surface can be recessed or concave. In all cases, it is preferred that the passageways through the sintered metal provide porosity throughout their length to enable creation of a venturi-like action creating turbulence in gas flow through the passageways. However, the oxygen passageways such as 21 have all surface pores blocked as by the use of tubes or coating materials.

It is a feature of this invention that the sintered metal inserts can be prepared inexpensively and attached to conventional torches for use in brazing and cutting without costly changeover of torch design. The mixing of gases within a torch tip can be carried out as normally done when the inserts are not used.

In view of the many modifications possible in the present invention, this invention is to be limited only by the spirit and scope of the following claims.

What is claimed is:

1. In a brazing or cutting torch the improvement comprising a torch tip for use in brazing or cutting comprising,
   a porous sintered high temperature resistant metal insert defining a forward surface for burning, a side surface, and a rear surface,
   a fuel gas supply area located adjacent and contacting substantially the entire rear surface,
   a fuel gas outlet passageway connected with said supply area and formed in said sintered metal insert extending to said forward surface with a wall surface of said passageway permitting gas flow from said insert to said passageway along the axial extent thereof and being substantially unobstructed whereby a gas mixture can be passed through said passageway and simultaneously through said insert with said gas mixture passing through said passageway which acts as means for permitting said gas to cause a venturi effect to draw a portion of said gas mixture through said insert into said passageway whereby turbulence is created in said passageway.

2. A torch tip in accordance with claim 1 and further comprising said insert having an unobstructed forward end and means for obstructing porosity of said side surface of said insert at least up to said forward end.

3. A torch tip in accordance with claim 1 wherein a single passageway is provided in said insert extending from a gas supply area adjacent said rear surface to a gas combustion surface area adjacent said forward surface.

4. A torch tip in accordance with claim 1 wherein an oxygen outlet passageway is provided in said sintered metal insert with wall areas of said oxygen outlet passageway being substantially nonporous.

5. A sintered metal insert in accordance with claim 4 wherein a plurality of parallel fuel outlet passageways are provided located about said oxygen passageway.

6. A torch tip in accordance with claim 4 wherein said insert is in the form of a ring.

7. A torch tip in accordance with claim 2 wherein an oxygen outlet passageway is provided in said sintered metal insert with wall areas of said oxygen outlet passageway being substantially nonporous,
   said fuel gas outlet passageway being defined in part by said insert and in part by a tube surrounding said insert.

8. A sintered metal insert in accordance with claim 7 wherein a plurality of parallel fuel gas outlet passageways are provided located about said oxygen passageway.

9. A torch tip in accordance with claim 2 wherein said means comprises an encircling tube.

10. A torch tip in accordance with claim 1 wherein the distance between said forward surface and said rear surface is in the range of from ¼ inch to 3 inches.

11. A method of brazing by the use of a torch tip in accordance with claim 1 comprising,
   passing a mixture of oxygen and a fuel gas to said fuel gas supply area,
   causing said mixture of fuel gas and oxygen to pass through said outlet passageway and simultaneously through said insert,
   and burning said fuel gas and oxygen mixture passing through said insert and said passageway at said forward surface.

References Cited

UNITED STATES PATENTS

| | | | |
|---|---|---|---|
| 1,066,915 | 7/1913 | Kemp et al. | 239—590.5 |
| 2,703,609 | 3/1955 | Bain et al. | 158—116 |
| 2,974,723 | 3/1961 | Blanchard | 158—27.4 |

M. HENSON WOOD, Jr., *Primary Examiner.*

H. NATTER, *Assistant Examiner.*

U.S. Cl. X.R.

239—590.5, 602